US008266575B1

(12) United States Patent
Ogami et al.

(10) Patent No.: US 8,266,575 B1
(45) Date of Patent: Sep. 11, 2012

(54) SYSTEMS AND METHODS FOR DYNAMICALLY RECONFIGURING A PROGRAMMABLE SYSTEM ON A CHIP

(75) Inventors: Kenneth Y. Ogami, Bothell, WA (US); Marat Zhaksilikov, Snohomish, WA (US); Andrew Best, Sanford, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 822 days.

(21) Appl. No.: 12/004,833

(22) Filed: Dec. 21, 2007

Related U.S. Application Data

(60) Provisional application No. 60/926,096, filed on Apr. 25, 2007.

(51) Int. Cl.
G06F 17/50 (2006.01)
G06F 15/04 (2006.01)
G06F 3/00 (2006.01)

(52) U.S. Cl. ......... 716/138; 716/117; 716/139; 715/700

(58) Field of Classification Search ............. 716/139, 716/117, 138; 715/700
See application file for complete search history.

(56) References Cited

U.S. PATENT DOCUMENTS

| | | | |
|---|---|---|---|
| 6,078,741 A | 6/2000 | Ma et al. | |
| 6,546,297 B1 | 4/2003 | Gaston et al. | |
| 6,941,356 B2 | 9/2005 | Meyerson | |
| 6,961,686 B2 | 11/2005 | Kodosky et al. | |
| 7,003,732 B1 | 2/2006 | Zhaksilikov | |
| 7,086,014 B1 * | 8/2006 | Bartz et al. | 716/102 |
| 7,100,133 B1 * | 8/2006 | Meiyappan et al. | 716/102 |
| 7,100,139 B1 | 8/2006 | Anderson et al. | |
| 7,113,090 B1 | 9/2006 | Saylor et al. | |
| 7,143,360 B1 * | 11/2006 | Ogami et al. | 715/763 |
| 7,299,307 B1 | 11/2007 | Early et al. | |
| 7,337,407 B1 * | 2/2008 | Ogami et al. | 715/762 |
| 7,437,692 B2 * | 10/2008 | Oberlaender | 716/138 |
| 7,809,545 B2 | 10/2010 | Ciofi et al. | |
| 2003/0110464 A1 * | 6/2003 | Davidson et al. | 716/17 |
| 2004/0221249 A1 * | 11/2004 | Lahner et al. | 716/4 |
| 2007/0050644 A1 | 3/2007 | Merkin | |
| 2008/0086668 A1 | 4/2008 | Jefferson et al. | |
| 2008/0178143 A1 | 7/2008 | Dougan et al. | |
| 2010/0023865 A1 | 1/2010 | Fulker et al. | |

OTHER PUBLICATIONS

"PSoC Designer: Integrated Development Environment User Guide"; Jul. 17, 2001; Cypress MicroSystems; Revision 1.11; All pages.*

Seguine et al.; "Layout Guidelines for PSoC CapSense"; Oct. 31, 2005; Cypress Perform; All pages.*

U.S. Appl. No. 12/058,586: "System and Method for Monitoring a Target Device," Kenneth Ogami et al., filed on Mar. 28, 2008; 56 pages.

U.S. Appl. No. 12/058,534: "System and Method for Controlling a Target Device," Kenneth Ogami et al., filed on Mar. 28, 2008; 55 pages.

(Continued)

Primary Examiner — Suresh Memula (57) ABSTRACT

Systems and methods for dynamically reconfiguring a programmable system on a chip. A graphical user interface for dynamically reconfiguring a programmable system on a chip includes graphical user interface (GUI) display elements of a plurality of parameter values presently controlling operation of a device on a target apparatus. The GUI display elements are operable to accept modifications to the plurality of parameter values and for communicating the modifications to the programmable system on a chip. The GUI display elements may present parameter values in alphanumeric and/or graphical formats, and may accept changes via keyboard or cursor directing device input.

10 Claims, 10 Drawing Sheets

OTHER PUBLICATIONS

USPTO Advisory Action for U.S. Appl. No. 12/058,586 dated Jan. 31, 2012; 3 pages.
USPTO Final Rejection for U.S. Appl. No. 12/058,586 dated Nov. 9, 2011; 14 pages.
USPTO Non-Final Rejection for U.S. Appl. No. 12/058,586 dated May 24, 2011; 13 pages.
USPTO Advisory Action for U.S. Appl. No. 12/058,534 dated Aug. 11, 2011; 3 pages.
USPTO Final Rejection for U.S. Appl. No. 12/058,534 dated Jun. 2, 2011; 15 pages.
USPTO Non-Final Rejection for U.S. Appl. No. 12/058,534 dated Jan. 11, 2011; 17 pages.
USPTO Final Rejection for U.S. Appl. No. 12/058,534 dated Apr. 25, 2012; 12 pages.
USPTO Non-Final Rejection for U.S. Appl. No. 12/058,534 dated Dec. 16, 2011; 11 pages.
USPTO Non-Final Rejection for U.S. Appl. No. 10/256,829 dated Jan. 9, 2009; 7 pages.

* cited by examiner

SYSTEMS AND METHODS FOR DYNAMICALLY RECONFIGURING A PROGRAMMABLE SYSTEM ON A CHIP

RELATED CASES

This application claims priority to U.S. Provisional Patent Application Ser. No. 60/926,096, filed Apr. 25, 2007, entitled "Novel Feature for PSOC Design Tool" to Best et al., which is hereby incorporated herein by reference in its entirety.

This application is related to United States patent application Ser. No. 9/989,817, filed Nov. 19, 2001, entitled "System and Method of Dynamically Reconfiguring a Programmable Integrated Circuit" and U.S. patent application Ser. No. 10/256,829, filed Sep. 27, 2002, entitled "Graphical User Interface for Dynamically Reconfiguring a Programmable Device" which are hereby incorporated herein by reference in their entirety.

BACKGROUND

Embodiments in accordance with the present invention generally relate to the field of integrated circuit chips. More specifically, embodiments of the present invention pertain to systems and methods for dynamically reconfiguring a programmable system on a chip.

BACKGROUND

The semiconductor industry has developed a wide range of integrated circuits that may be configured, e.g., customized, by system designers, as opposed to integrated circuit designers, to perform a wide variety of tasks that previously would have required a customized integrated circuit design. Such integrated circuits include field programmable gate arrays (FPGAs), complex programmable logic devices (CPLDs), field programmable analog arrays (FPAAs) and the like.

One exemplary family of configurable integrated circuits is the PSoC® programmable system on a chip integrated circuit family, commercially available from Cypress Semiconductor of San Jose, Calif. One set of products, PSoC® mixed-signal arrays, are programmable systems-on-chips (SOCs) that integrate a microcontroller and the analog and digital components that typically surround it in an embedded system. A single PSoC® device can integrate as many as 100 peripheral functions with a microcontroller, saving customers design time, board space, power consumption, and bill of materials cost.

PSoC® mixed-signal arrays are well suited to capacitive sensing applications. Capacitive sensing generally includes capacitive sensors for buttons (switches), linear and radial sliders, touchpads, touchscreens and the like. User interaction with such sensors, e.g., touching, is detected by changes in capacitance among such sensors. For example, rather than detecting a make or break of electrical contacts, capacitive sensing detects changes in capacitance to determine button activation.

Unfortunately, the physical design of such sensors, as well as capacitive interaction of such sensors with other physical elements of a target device requires a great amount of tuning, debugging and parametric optimization of devices in the target application in order to achieve satisfactory function.

Under the conventional art, these processes may at times be cumbersome and error prone. For example, optimization of capacitance sensing applications generally requires monitoring raw capacitive sensing data ("counts"), baseline and other data in real time. Such optimization in the target hardware is required to set a variety of processing parameters according to the sensors geometrical dimensions, overlay thickness and dielectric properties. Additionally, this data should be monitored to check performance margins, test system operation under temperature, humidity and various noise sources influence.

Unfortunately, conventional art tools are not generally optimized for capacitance sensing applications, and the data is represented in a non-intuitive manner. For example, a conventional art charting tool may present button activation capacitive data in a non-intuitive graphical format. In addition, most such tools require a user to manually enter command strings in order to obtain such data. Such tools do not relate well to capacitance sensing applications, and may be cumbersome and error prone In addition, real time monitoring and/or control of operating components can be challenging. Traditional monitoring and/or control of integrated circuits typically involves complex interactions with complicated command structures and syntaxes that are not readily comprehendible or user friendly. Recognizing alterations in convoluted expressions of operating states, evaluating implications of the alterations and/or reacting to the evaluation appropriately using elaborate command and data input mechanisms with sufficient speed to be useful in real time real time is particularly difficult.

In addition, implementing changes to operating parameters generally requires a time consuming and error prone processes of changing some parameters in a source design file, compiling the source file into configuration data, loading the configuration data into the target hardware, and observing the results of the changed parameters. Changing even a few such parameters can require numerous undesirable iterations of this process.

SUMMARY OF THE INVENTION

Therefore, systems and methods for dynamically reconfiguring a programmable system on a chip are needed. In addition, systems and methods for dynamically reconfiguring a programmable system on a chip that provide graphical user interface display elements of a plurality of parameter values presently controlling operation of a device on a target apparatus are needed. A further need exists for systems and methods for dynamically reconfiguring a programmable system on a chip that provide graphical user interface display elements operable to accept modifications to the plurality of parameter values. A still further need exists for systems and methods for dynamically reconfiguring a programmable system on a chip that are compatible and complimentary with existing methods of integrated circuit device configuration. Embodiments of the present invention provide these advantages.

Accordingly, systems and methods for dynamically reconfiguring a programmable system on a chip are disclosed. A graphical user interface for dynamically reconfiguring a programmable system on a chip includes graphical user interface (GUI) display elements of a plurality of parameter values presently controlling operation of a device on a target apparatus. The GUI display elements may reside on a host computer system and are operable to accept modifications to the plurality of parameter values and for communicating the modifications to the programmable system on a chip that is communicatively coupled to the host computer system. The GUI display elements may present parameter values in alphanumeric and/or graphical formats, and may accept user input via keyboard or cursor directing device input.

In accordance with a method embodiment of the present invention, a method for dynamically reconfiguring a programmable system on a chip includes displaying a first window comprising a representation of a target apparatus, the target apparatus including the programmable system on a chip. Responsive to a selection of a graphical element of the representation, a second window including graphical user interface (GUI) display elements of a plurality of parameter values presently controlling operation of a device corresponding to the graphical element is displayed. A modification to the plurality of parameter values via the GUI display elements is accepted and the modification is communicated to the programmable system on a chip.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings are not drawn to scale.

DETAILED DESCRIPTION

Reference will now be made in detail to various embodiments of the invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Notation and Nomenclature

Some portions of the detailed descriptions which follow (e.g., process 1000) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussions, it is appreciated that throughout the present invention, discussions utilizing terms such as "indicating" or "displaying" or "accepting" or "producing" or "transmitting" or "receiving" or "advancing" or "comparing" or "processing" or "computing" or "translating" or "calculating" or "determining" or "excluding" or "recognizing" or "generating" or "assigning" or "initiating" or "collecting" or "transferring" or "switching" or "accessing" or "retrieving" or "receiving" or "issuing" or "measuring" or "conveying" or "sending" or "dispatching" or "advancing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Systems and Methods for Dynamically
Reconfiguring a Programmable System on a Chip While exemplary embodiments of the present invention are illustrated with PSoC® devices, configuration software and common capacitance sensing and lighting control applications, it is appreciated that embodiments in accordance with the present invention are not limited to such exemplary devices and applications, and are well suited to many types of configurable integrated circuits and software applications.

PSoC® Express™, commercially available from Cypress Semiconductor of Sari Jose, Calif., is a development tool that allows a developer to drag and drop on-screen design elements (graphical user interfaces, GUIs or "widgets") within a design window of a host computer system in order to build a design that can be downloaded into a microcontroller device. The design elements may be input devices, output devices, transfer functions and the like. Design elements are high level functionality that comprise a design made up of lower level user modules configured in a particular manner.

In accordance with embodiments of the present invention, a graphical user interface allows one or more of the design elements to be individually tuned, e.g., adjusted to improve performance, during run-time. Certain design elements, e.g., input devices, output devices, transfer functions, etc., have configurable properties that are used in processing the function of the design element. These configurable properties influence how the input or output device operates. For example, a threshold value indicates the signal level required for a button to register as on or off. By adjusting this value, the button can become more or less sensitive to touch. Such values are typically constants during run time, and may be stored in read only memory (ROM), or more typically in flash erasable read only memory ("flash"). Other adjustable items may include parameters, baseline values and/or update rates.

Embodiments in accordance with the present invention provide a graphical user interface for a particular design element that is customized for that widget and that allows a user to alter configurable parameters during run-time of a target system. The GUI may display a graphical representation of each property and allow the user to alter the value of that property. Once the designer has altered the parameter(s), the real-time behavior of the target system, e.g., including target system software, is adjusted to correspond to the altered parameter(s). This functionality enables a designer to tune, or optimize a widget's configuration parameters for a particular target hardware environment.

Once a desirable set of parameters is obtained, the designer may select to commit the set of parameters to a "build" or configuration file. In this manner, the desirable set of parameters may be included in the data that is loaded into the target device to configure its operations. The configuration may also be promulgated to other, similar systems, e.g., mass produced versions of the target system.

Figure 1:
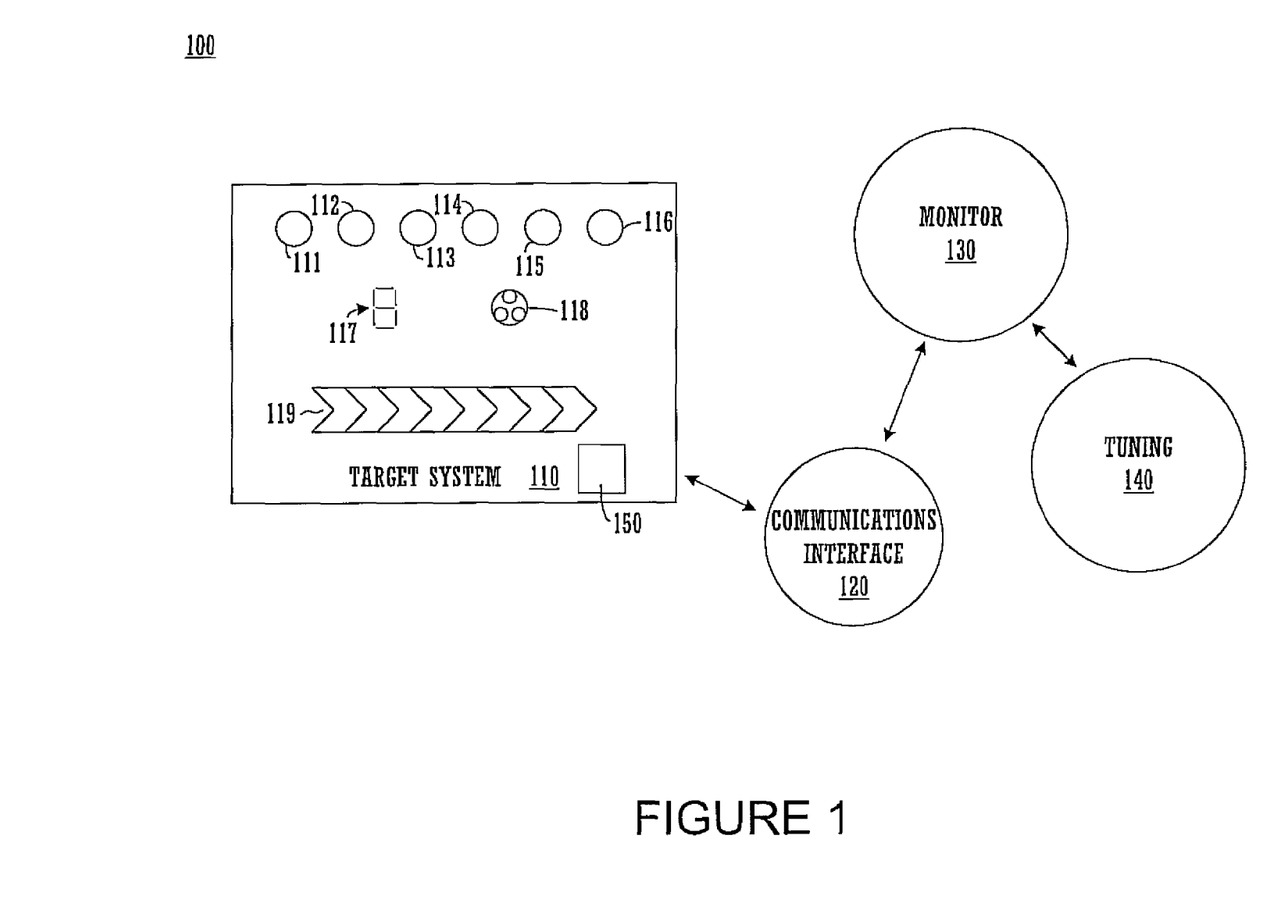
FIG. 1 illustrates a block diagram of a functional coupling and data flow of a novel visualization tool to target hardware, in accordance with embodiments of the present invention.

FIG. 1 illustrates a block diagram 100 of a functional coupling and data flow of a novel visualization tool 130 to target hardware 110, in accordance with embodiments of the present invention. Exemplary target hardware 110 may comprise a variety of capacitive sensors, e.g., capacitive sensors for buttons (switches), linear and radial sliders, touchpads, touchscreens and the like. As previously described, such capacitive sensors are influenced by various elements of a target hardware design: In addition, target hardware 110 may comprise a variety of output devices, e.g., seven-segment LEDs and/or "high brightness" LEDs. The target hardware may also include a programmable controlling device 150, such as a programmable microcontroller, e.g., a PSoC® Mixed-Signal Array programmable system on a chip.

In the embodiment of FIG. 1, the target hardware 110 comprises six capacitively sensed buttons, 111-116, a seven segment LEDs 117 and a "high brightness" LED 118. The "high brightness" LED 118 further comprises a triad of colored LEDs, e.g., red, blue and green, to produce a spectrum of colors. Target hardware 110 further comprises a multi-segment linear capacitive slider 119.

It is appreciated that the buttons, LEDs and sliders of target hardware 110 operate via a combination of hardware and software operating as part of the target hardware or apparatus. For example, a PSoC® device comprises configurable hardware to physically sense hardware devices and configurable software to control and interpret such interactions, e.g., to determine if a particular physical input corresponds to a user action. Such software generally comprises filters and transfer functions involving numerous configurable parameters.

Communications interface 120 provides a communications interface between the target hardware 110 and the monitor tool 130. In an exemplary PSoC® embodiment, a PSoC® device may be configured to provide an Inter-Integrated Circuit ($I^2C$) communications port. In this embodiment, communication 125 is $I^2C$ communication, but could be any other type of serial or parallel communication channel, in accordance with alternative embodiments of the present invention. This port may be used to for two way information exchange with another computer, e.g., the computer environment of monitor tool 110. For example, target hardware 110 may receive commands from monitor tool 130, and report data to monitor tool 130.

Many host computer systems, e.g., PCs, do not have an $I^2C$ port, and thus a communications interface 120 is useful. Communications interface 120 functionally couples target hardware 110 to monitor tool 130. In one embodiment, communications interface 120 may convert between universal serial bus (USB) communications 135 and $I^2C$ communications 125. It is appreciated that embodiments in accordance with the present invention are well suited to other communications protocols and may not require a communications interface 120. For example, the data can be sent to a development system, e.g., a PC, using Inter-Integrated Circuit ($I^2C$) communications, Serial Peripheral Interface Bus (SPI) communications, universal asynchronous receiver/transmitter (UART) communications, universal serial bus (USB) communications, Ethernet communications, etc. An additional interface translator can be used to translate the data stream from one interface (for example, $I^2C$) to communicate with interface(s) available in the PC, e.g., USB.

Monitor tool 130 is generally implemented as a software application operating on a desktop computer or workstation host system, e.g., a PC. This interface can be implemented by a combination of hardware and driver software layers. The software layers generally include corresponding drivers that handle low-level hardware interfaces and operate using dedicated driver function calls or PC operating system API calls.

Figure 2:
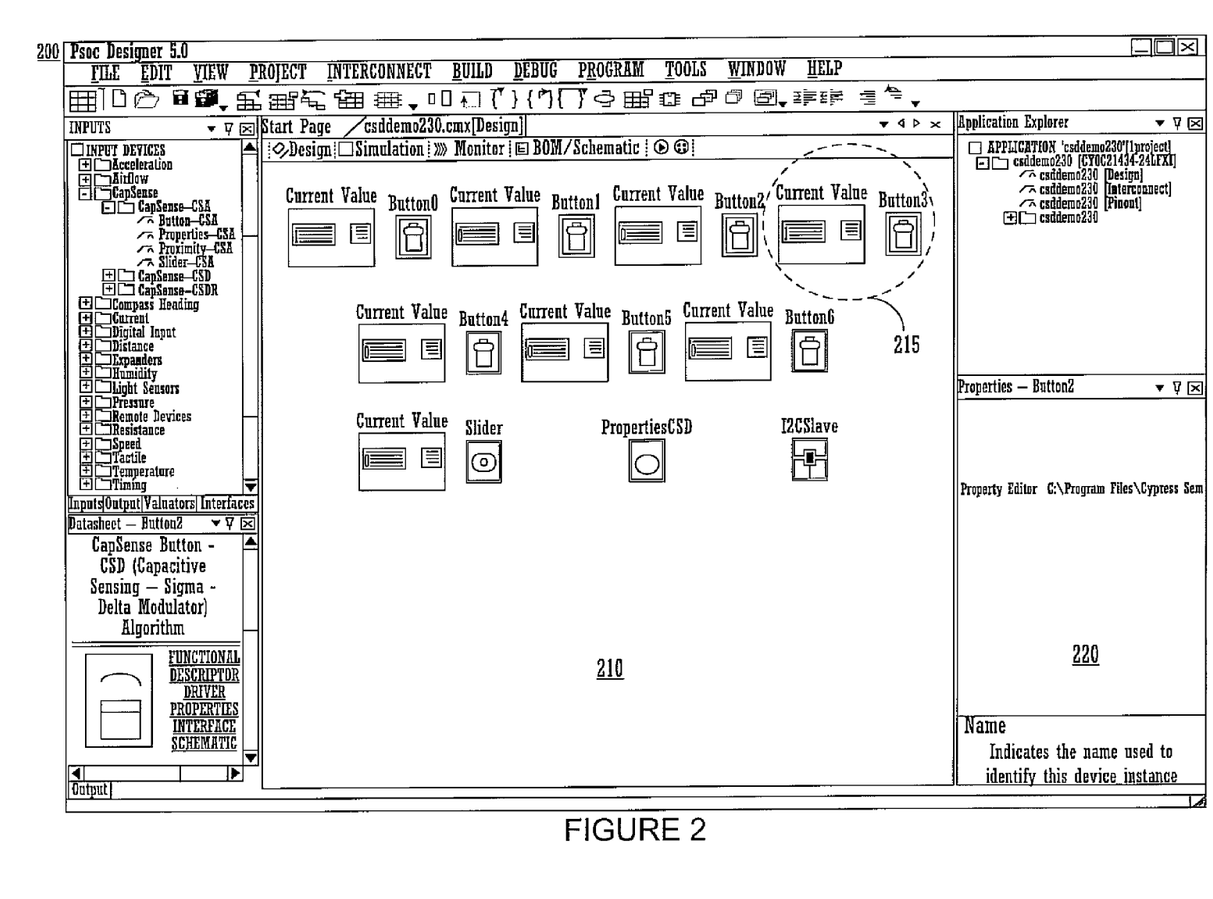
FIGS. 2, 3, 4, and 5 illustrate exemplary on-screen displays, e.g., graphical user interfaces, of a novel target system monitoring and reconfiguration tool, in accordance with embodiments of the present invention.

FIG. 2 illustrates an exemplary on-screen display 200, e.g., a graphical user interface, of a novel target system monitoring and reconfiguration tool, in accordance with embodiments of the present invention. The target system monitoring tool may operate on a variety of host system computer platforms, e.g., a workstation and/or a PC. On-screen display 200 shows multiple windows, including monitor window 210 and properties widow 220.

Monitor window displays an information group, e.g., information group 215, for each interface device on the target hardware, e.g., target hardware 110 of FIG. 1. For example, exemplary monitor window 210 illustrates seven information groups, one for each of the six buttons (111-116) and one for the slider (119) shown on target hardware 110 of FIG. 1.

Information groups generally comprise an icon identifying the device, e.g., as a button, LED, slider, etc., and an editable display of a controlling parameter for that device. For example, information group 215 shows a button icon and a current value window, displaying the value "1." The current value window displays the actual value of the controlling parameter. In this exemplary embodiment, the value displayed is "1," indicating that the button is being interpreted by the target system as activated or touched.

A configurable integrated circuit is configured according to a configuration file. A configuration file generally comprises bit patterns related to switches within the configurable integrated circuit that control a functional coupling of configurable blocks in a desired configuration. A configuration file may be stored within a configurable integrated circuit, e.g., in flash memory, or a configurable integrated circuit may be designed to read in such a file from an external device, e.g., a ROM, upon reset processing. In the case of a configurable system on a chip, e.g., a PSoC® device, the configuration file generally comprises software instructions as well. Creating such a configuration file is one task of a design system for designs based on configurable integrated circuits.

Properties window 220 shows a plurality of properties of a selected icon of monitor window 210. For example, properties window 220 shows the PSoC® driver version, a finger threshold, scan speed, scanning resolution, a reference value and a tuning value exposure control for button 2. The properties displayed in properties window 220 correspond to the values that are in, or are to be placed into, a configuration file.

Figure 3:
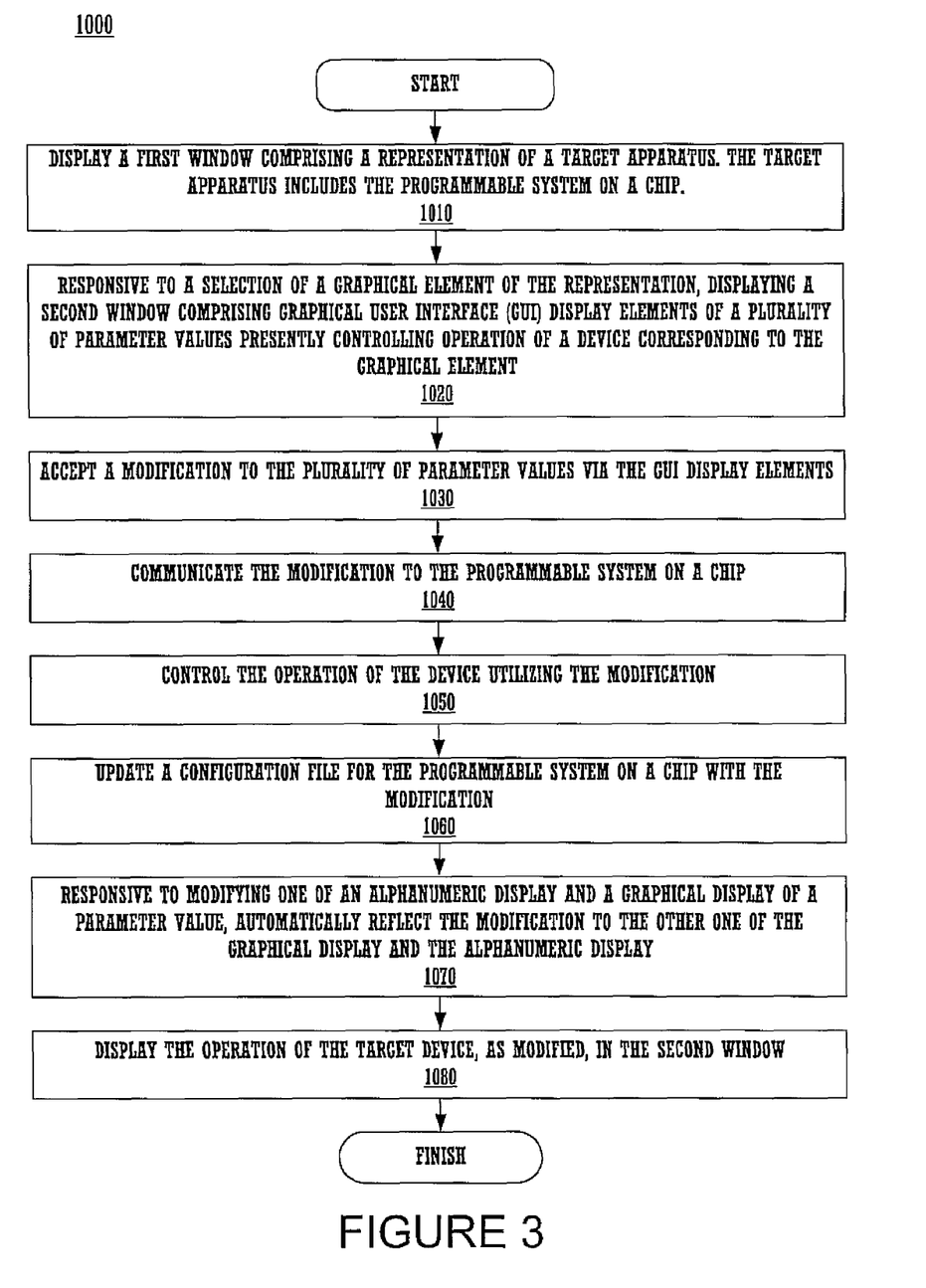

FIG. 3 illustrates an exemplary on-screen display 300, e.g., a graphical user interface, of a novel target system monitoring and reconfiguration tool, in accordance with embodiments of the present invention. Display 300 comprises a monitor window 310, which is analogous to monitor window 210 of FIG. 2. Responsive to a selection action, e.g., "right clicking" a cursor directing device, e.g., a mouse, over an information group or icon, tuning window 320 is presented.

Tuning window 320 is a customized graphical user interface that is specific to a specific type of user interface device. In the embodiment of FIG. 3, tuning window 320 corresponds to a capacitively sensed button. Tuning window is specific to button 5, e.g., button 115 of FIG. 1. For example, a user of the target system monitoring and reconfiguration tool clicked a right mouse button over an icon for button 5, obscured in the view of FIG. 3, to cause the system to display tuning window 320.

Tuning window 320 displays button properties for the selected button, e.g., button 5. For example, tuning window 320 displays sensed values and a plurality of configurable values, e.g., as used in transfer functions, related to the processing of information related to a particular input or output device.

In the case of a capacitively sensed button, as represented in tuning window 320, one output of such processing may be whether a button is pushed or touched. The "status" output 315, in this example the value is 1, indicates this determination. Status window 330 displays a history of the status determination.

In the embodiment of FIG. 3, tuning window 320 displays configurable parameters finger threshold 396, scanning resolution, a reference value, scan speed, noise threshold 395, negative noise threshold, baseline update threshold, hysteresis, debounce, and low baseline reset in editable display fields. Tuning window 320 also display's sensed and computed output values including raw count, difference (between raw count and threshold), baseline and status 315, e.g., the processing routine's determination of touched or not touched.

In addition to the editable display fields, tuning window 320 displays sensed and computed output values and configurable parameters in a graphical format, in graphic display area 345. Bar 340 indicates a raw count of 619, e.g., the actual sensor value. The value of bar 340 corresponds to the numeric display of raw count, described previously. Line 350 indicates a negative noise threshold. Line 350 corresponds to the editable display field for negative noise threshold, described previously. Line 360 indicates a noise threshold, and corresponds to the editable display field 395 for noise threshold, described previously.

Line 380 indicates a finger threshold and corresponds to the editable display field for finger threshold 396, described previously. Lines 380A and 380B indicate plus and minus values, respectively, for the hysteresis value relative to the finger threshold. The difference between the finger threshold and lines 380A and 380B corresponds to the editable display field for hysteresis, described previously.

In accordance with embodiments of the present invention, lines 340, 350, 360, 370, 380A and 380B may be displayed with differentiating visual attributes that correspond to the editable displays of corresponding parameters. In one embodiment, color may be the visual attribute. For example, line 360, graphically displaying noise threshold, may be displayed in green and the title 390 for the noise threshold editable display field may also be displayed in green.

In accordance with embodiments of the present invention, the parameters used for processing of information related to a particular input or output device may be changed by a user action of changing, e.g., typing over, a value in an editable display field, e.g., editable display field 395. Alternatively, such parameters may be changed by a user action of changing, e.g., "dragging," a display line corresponding to such a parameter. For example, finger threshold 396 may be adjusted by either or both of typing a new value into finger threshold editable display field 396, or by dragging line 370 up or down in the graphical portion of tuning window 310. When such parameters are changed, the new values are used by the software of the target system, e.g., operating on a PSoC® device, utilize such new values to control an output device or to determine user interaction with an input device, e.g., whether a button is touched.

Figure 4:
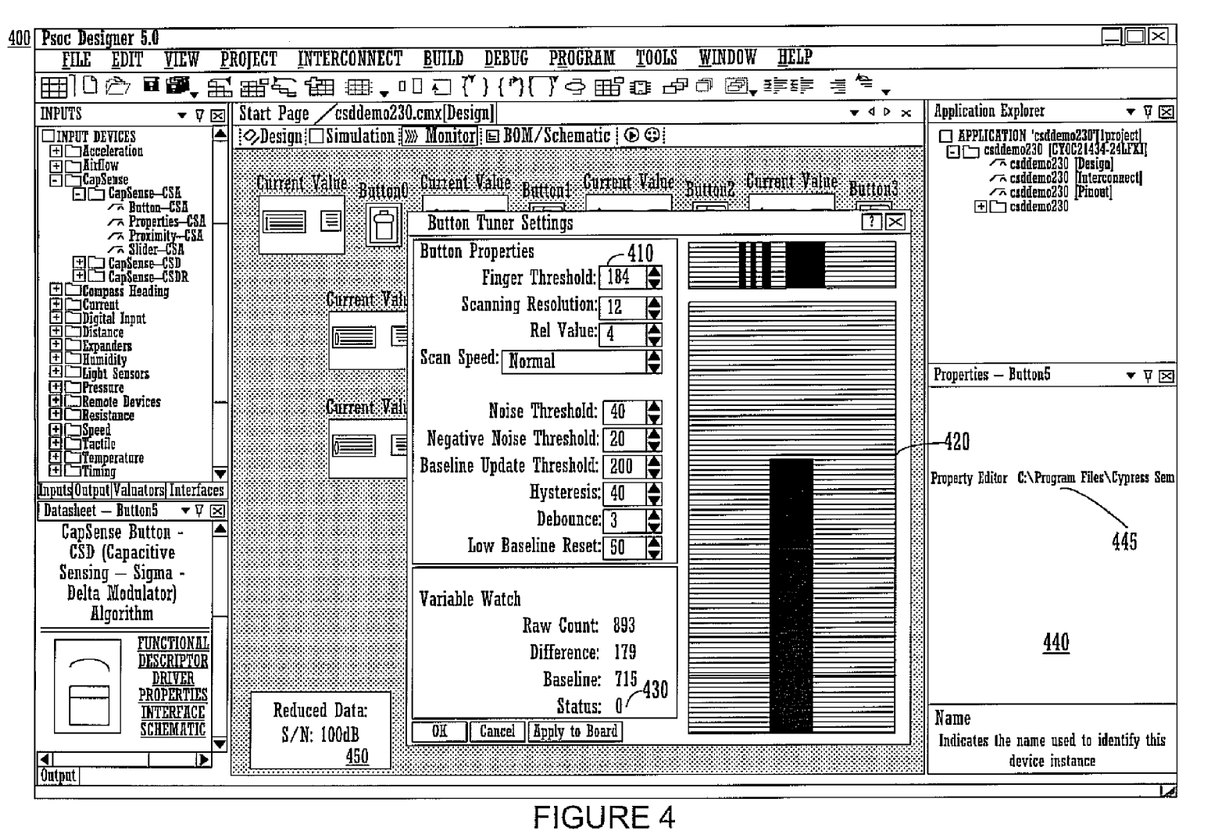

FIG. 4 illustrates an exemplary on-screen display 400, e.g., a graphical user interface, of a novel target system monitoring and reconfiguration tool, in accordance with embodiments of the present invention. Display 400 is similar to display 300, as described previously with respect to FIG. 3. In FIG. 4, finger threshold 410 has been modified from its value of 100 as shown in FIG. 3, to a value of 184. This change may have been made by user action in typing over the value in editable display field 410 and/or dragging line 420 "up." It is appreciated that changes made via one method are automatically reflected in the corresponding display. For example, dragging line 420 automatically changes the number displayed in editable display field 410, and vice versa. In addition, the hysteresis value has been changed between FIGS. 3 and 4.

It is to be further appreciated that the target system in the embodiment of FIG. 4 is determining and reporting a status 430 of "0," indicating a determination that the button is no longer touched, based on the new set of parameters. Thus, in accordance with embodiments of the present invention, the target system is updated based on user actions in the graphical user interface of the tuning window. Such updates are immediately utilized by the target system to control outputs or determine inputs.

Although parameters utilized by the target system have been changed, and the target system is processing using the changed parameters, properties window 440 still reflects the values within a configuration file. For example, properties window 440 shows finger threshold 445 to be 100, as previously shown in FIG. 3.

In accordance with embodiments of the present invention, the monitoring and tuning GUI software may perform a variety of data reductions and/or data analysis operations on the data received from the target system. For example, data reduction window 450 displays a calculated signal to noise (S/N) ratio. It is appreciated that such data analysis is performed by the host computer system using data received from the target system. For example, the target system does not determine a signal to noise ratio. In this manner, embodiments in accordance with the present invention may provide useful data analysis to guide a designer in adjusting the plurality of adjustable parameters.

Figure 5:
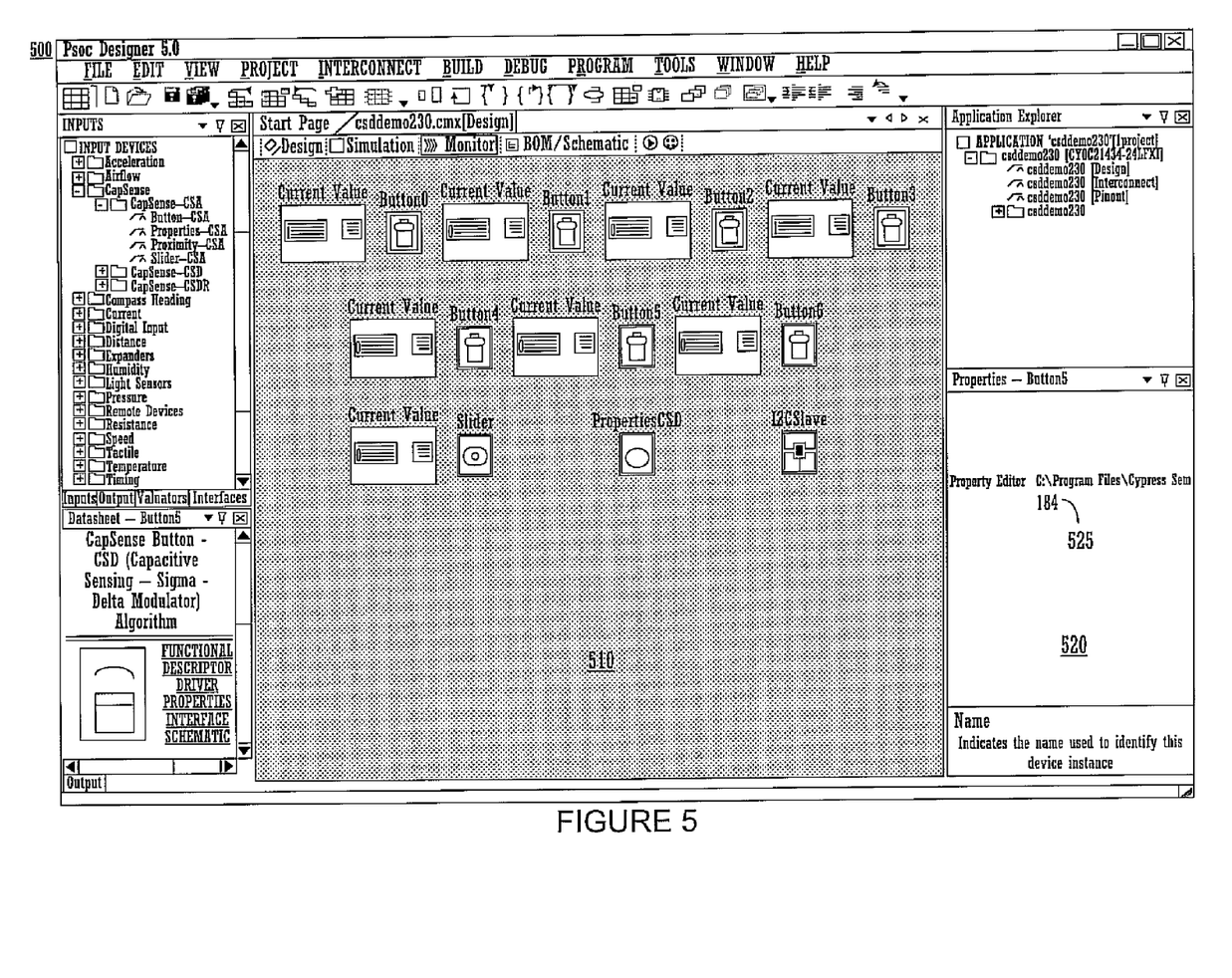

FIG. 5 illustrates an exemplary on-screen display 500, e.g., a graphical user interface, of a novel target system monitoring and reconfiguration tool, in accordance with embodiments of the present invention. Display 500 is generally analogous to display 200 of FIG. 2, and may result from dismissing the tuning window of FIG. 4 via an "OK" button.

No tuning window is displayed, and the main portion of display 500 has reverted to monitor window 510, which is generally analogous to monitor window 210. However, properties window 520 reflects the properties changes discussed with respect to FIG. 4. For example, finger threshold 525 now has the value 184. Further, this new value is now a part of the configuration file.

It is appreciated that FIG. 4 illustrates parameter changes to a specific target system. In one embodiment, such parameters may be stored in changeable, persistent memory, e.g., flash memory or battery-backed up ROM. In such a case, such parameter changes may be permanent for that particular system. However, in the embodiment of FIG. 4, such parameter changes are not reflected in the configuration file. Consequently, such parameter changes will be overwritten, e.g., lost, if that system re-reads the configuration file. Likewise, other systems, e.g., in mass production, operating from the configuration file will not reflect the changed parameters.

In contrast, in the embodiment of FIG. 5, the configuration file has been updated with the changed parameters. Beneficially, the changed parameters may be used in the specific target system, as well as in other systems.

In accordance with embodiments of the present invention, selecting "Apply to Board" within a tuning window, e.g., tuning window 320 (FIG. 3) may commit changed parameters to a configuration file without dismissing the tuning window. Similarly, selecting "cancel" may dismiss the tuning window without changing the parameter file.

Figure 6:
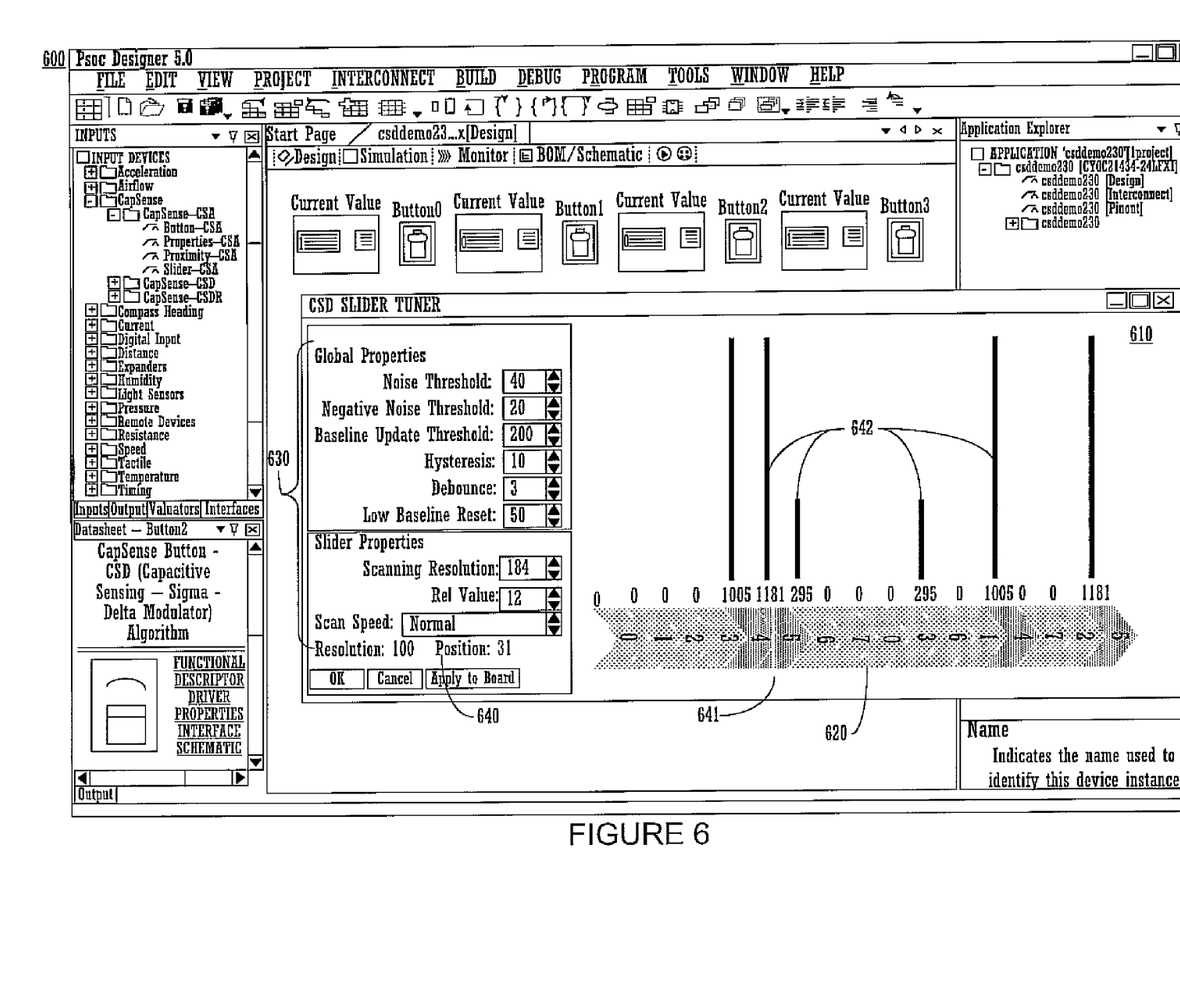
FIG. 6 illustrates an exemplary on-screen display, e.g., a graphical user interface, of a tuning window for a capacitively sensed linear slider, in accordance with embodiments of the present invention.

FIG. 6 illustrates an exemplary on-screen display 600, e.g., a graphical user interface, of a tuning window 610 for a capacitively sensed linear slider, in accordance with embodiments of the present invention. Capacitively sensed linear sliders are commonly used for volume and brightness controls, for example.

Tuning window 610 may be customized to the particular design of a slider, e.g., slider 119 of FIG. 1. Tuning window 610 reflects, for example, the number of sensing elements in a slider 620 and the diplexing of those elements. For example, multiple sense elements may be coupled to the same pin of a configurable integrated circuit in a diplexing arrangement, such that a configurable integrated circuit with relatively few input/output pins may access a relatively larger number of segments in a slider configuration.

As with tuning window 320 (FIG. 3), tuning window 610 provides a plurality of editable displays 630 for various parameters associated with processing input from a linear slider. For example, editable displays 630 comprise a noise threshold, negative noise threshold, baseline update threshold, hysteresis, debounce, low baseline reset scanning resolution, reference value and scan speed.

Graphical slider 620 provides a representation of the physical layout of the slider, e.g., slider 119 of FIG. 1. Graphs 642 provide a graphical representation of the raw counts corresponding to each sensor, or group of sensors. For example, as illustrated, sensor 4 actually measures a combination of capacitance from two physically separate, but electrically common sense elements.

Tuning window 610 displays the computed position of a finger, both in numeric display 640 and in position indicator 641. The computed position is a function of the sensed capacitance at a plurality of sensors and the parameters displayed in editable displays 630.

As illustrated and described previously, changes made to the parameters displayed in editable displays 630 are communicated to the target system, and used in determination of inputs. Such changes may be reflected in a configuration file by dismissing tuning window 610 via, e.g., the "OK" button.

Figure 7:
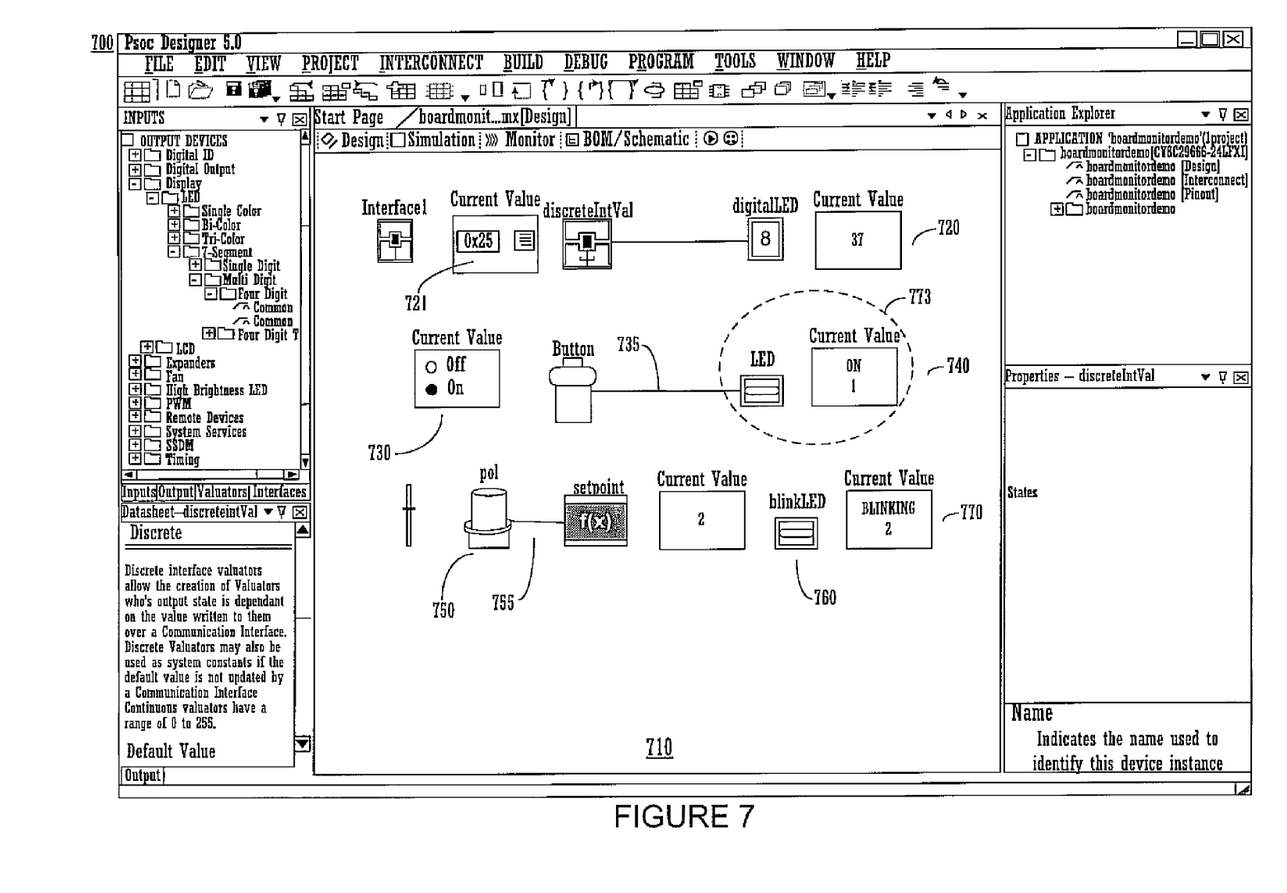
FIG. 7 illustrates an exemplary on-screen display, e.g., a graphical user interface, of a monitor window for a variety of input/output devices, in accordance with embodiments of the present invention.

FIG. 7 illustrates an exemplary on-screen display 700, e.g., a graphical user interface, of a monitor window 710 for a variety of input/output devices, in accordance with embodiments of the present invention. Monitor window 710 comprises an information group 720, corresponding to an alphanumeric LED display, e.g., a seven segment LED. Information group 720 comprises an editable current value window 721 displaying the hexadecimal value "0x25." Information group 720 further comprises a representation of the display on the target device, e.g., the decimal equivalent of the current value, 37.

Information group 740 comprises an information group 730 for a simple, e.g., non-capacitive button, and an information group 737 for an LED display. Linkage 735 indicates that these devices are linked in the design, e.g., the position of the button determines the function of the LED. As indicated, the button is "on," and the LED is "on."

Information group 770 comprises an information group 750 for a potentiometer, coupled by linkage 755 to an information group 760 for a blinking LED. The position of the potentiometer controls the blink rate of the LED.

Figure 8:
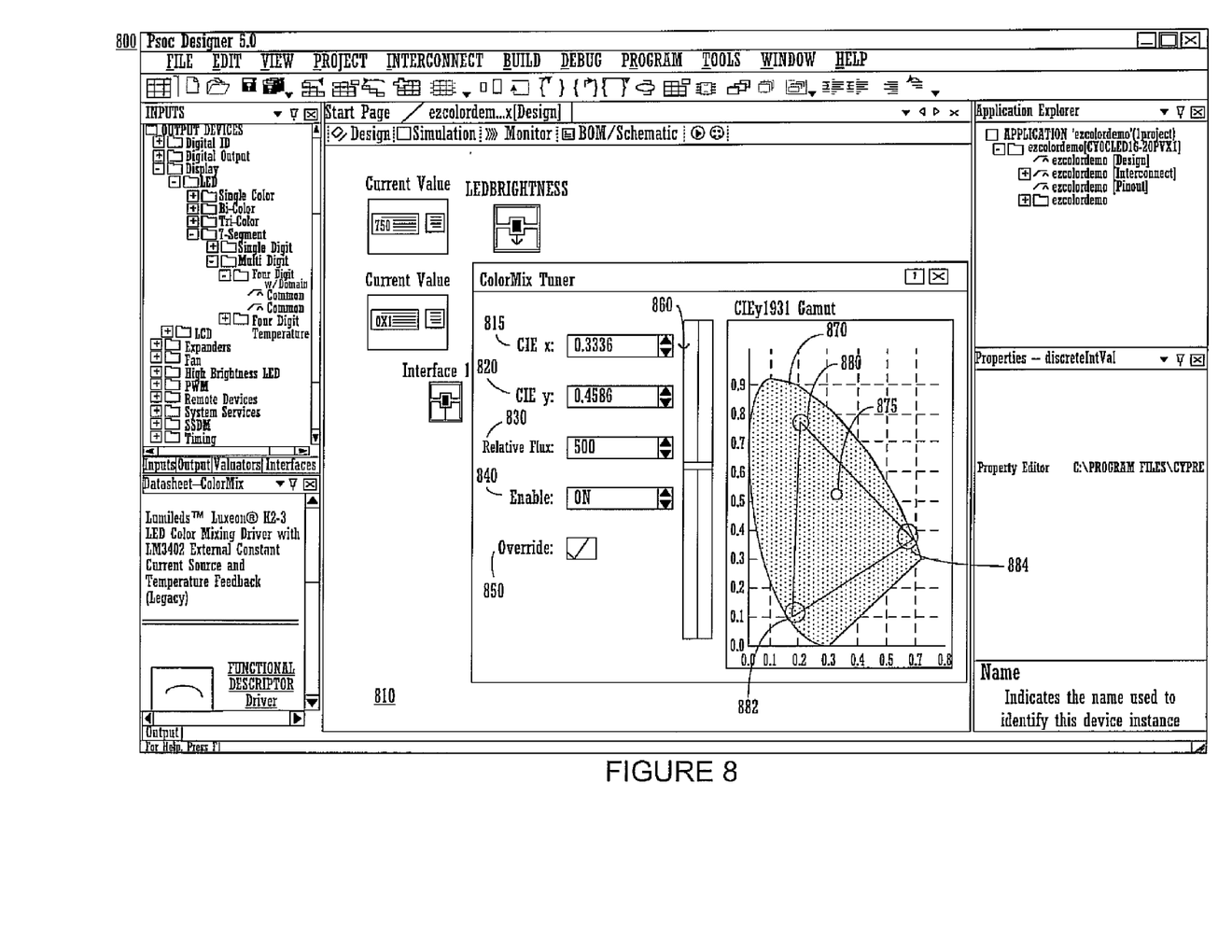
FIG. 8 illustrates an exemplary on-screen display, e.g., a graphical user interface, of a monitor window for a high brightness LED, in accordance with embodiments of the present invention.

FIG. 8 illustrates an exemplary on-screen display 800, e.g., a graphical user interface, of a monitor window 810 for a high brightness LED, in accordance with embodiments of the present invention. A high brightness LED, e.g., high brightness LED 119 of FIG. 1, is generally a triad of three monochromatic LEDs, e.g., red, green and blue, used to produce a spectrum of colors.

In the embodiment of FIG. 8, high brightness LED monitor window 810 utilizes the C.I.E. (International Commission on Illumination) Color Space system. Embodiments in accordance with the present invention are well suited to other systems of describing color. High brightness LED monitor window 810 comprises editable displays for CIEx 815, CIEy 820 and relative flux 830. High brightness LED tuning window 810 further comprises editable displays for enabling 840 the LED, and an override function check box 850.

The output of the high brightness LED is represented graphically within CIE Chromaticity Diagram 870. CIE Chromaticity Diagram 870 represents the mapping of human color perception in terms of two parameters, CIEx and CIEy. The spectral colors are distributed around the edge of the "color space" as shown.

Vertex 880 represents the output of a green LED. Vertex 882 represents the output of a blue LED, and vertex 884 represents the output of a red LED. Thus, the triangle formed by vertices 880, 882, and 884 represents the range of colors that may be produced by the high brightness LED. Slider display 860 graphically represents the relative flux, corresponding to the value in relative flux editable display 830.

Indicator 875 represents the color output of the high brightness LED, as determined by CIEx and CIEy. If the override check box 850 is unchecked, the tuner window 810 is for reporting only, and the color of the high brightness LED may not be adjusted. If the override check box 850 is checked, indicator 875 may be moved by user control, e.g., dragged with a mouse, to change the output of high brightness LED. It is appreciated that the values in editable displays CIEx 815 and CIEy 820 are automatically adjusted with the movement of indicator 875. Alternatively, the values in editable displays CIEx 815 and CIEy 820 may be changed, e.g., typed over, causing a change in the output of high brightness LED and automatically changing the position of indicator 875.

Figure 9:
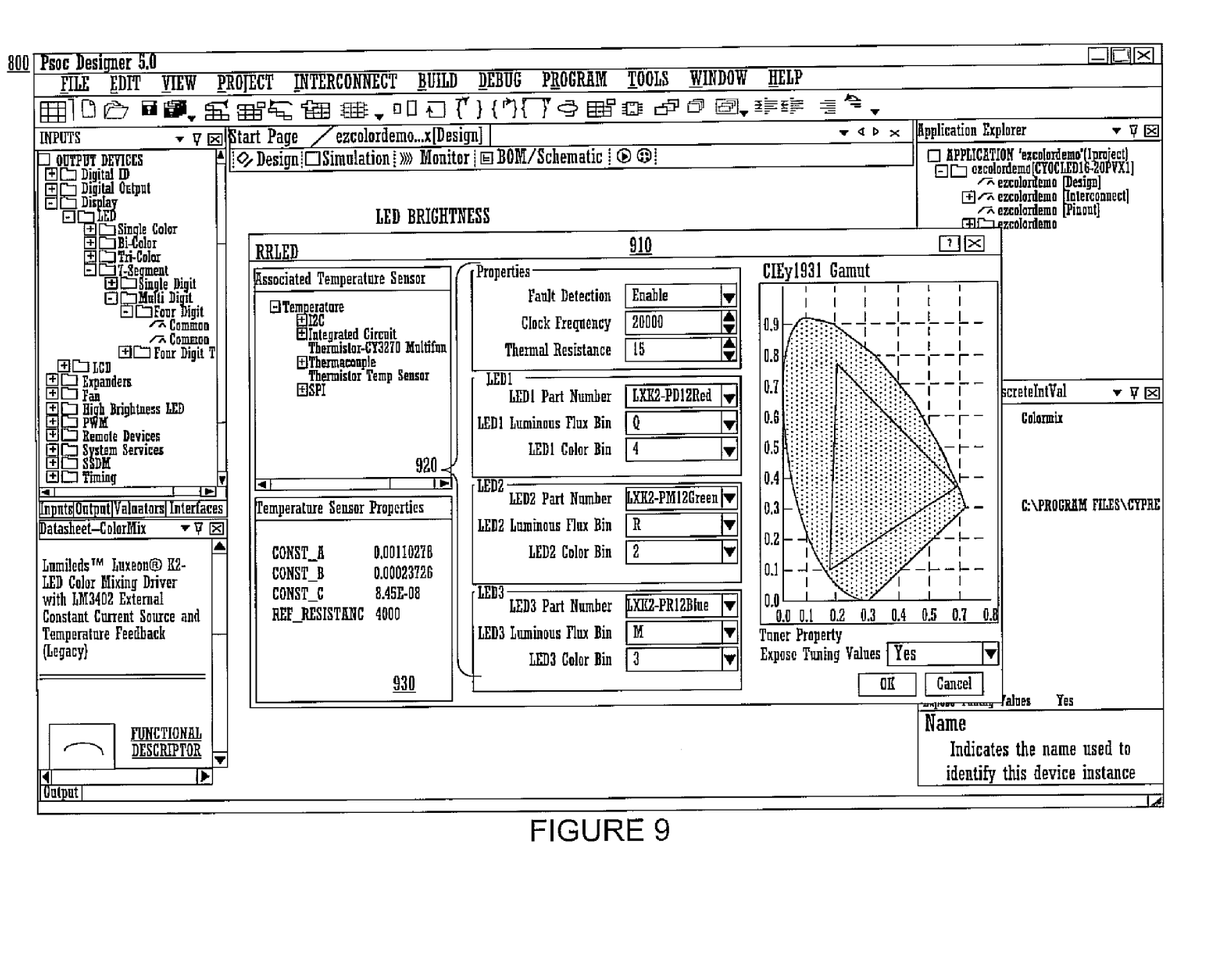
FIG. 9 illustrates an exemplary on-screen display, e.g., a graphical user interface, comprising an exemplary tuning window for a high brightness LED, in accordance with embodiments of the present invention.

FIG. 9 illustrates an exemplary on-screen display 900, e.g., a graphical user interface, comprising an exemplary tuning window 910 for a high brightness LED, in accordance with embodiments of the present invention. High brightness LED tuning window 910 enables a designer to adjust a variety of parameters related to the processing of a desired color output. Editable displays 920 correspond to various parameters specific to the three LEDs, fault detection, clock frequency and thermal resistance. For example, information related to the bin of a particular LED may be used by software of the target system to adjust current to that LED in order to achieve a desired color output.

As LED brightness and/or chromaticity may be affected by temperature, high brightness LED tuning window 910 comprises an editable temperature sensor properties window 930.

Figure 10:
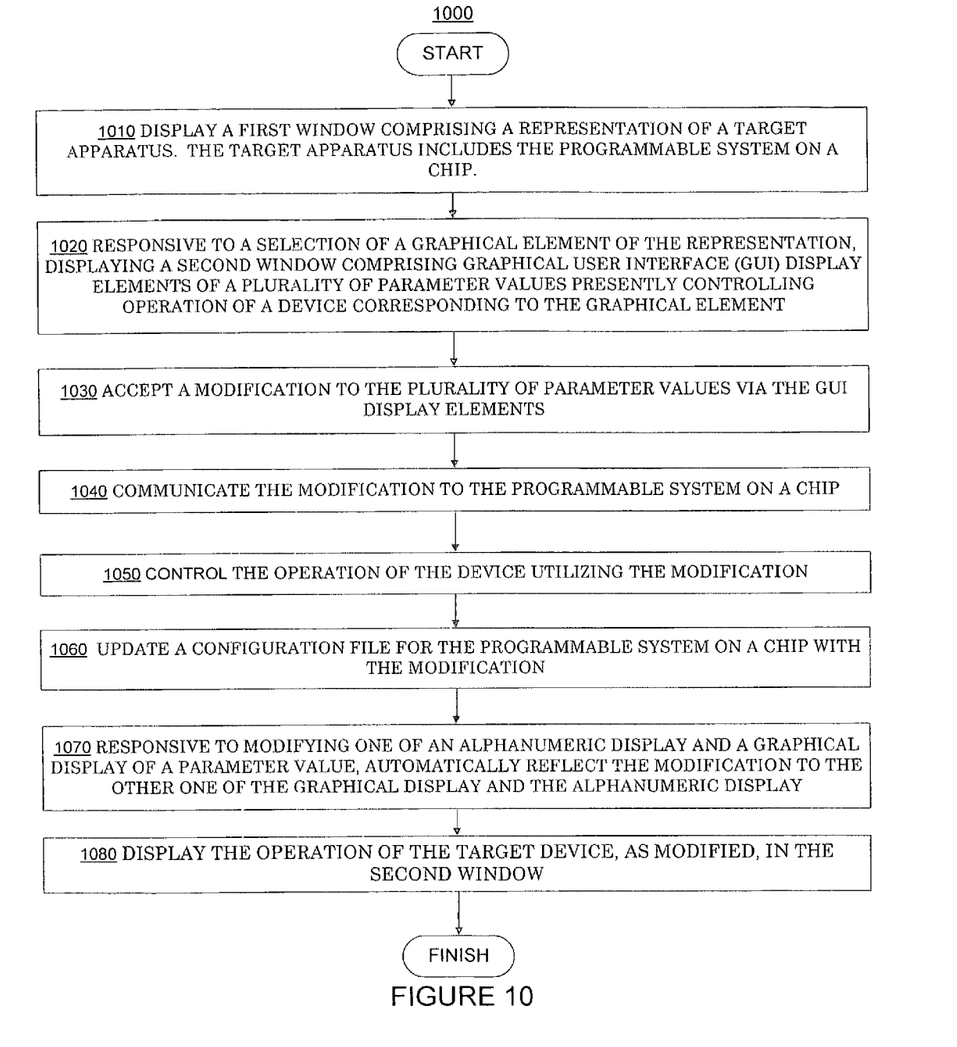
FIG. 10 illustrates a flow diagram of an exemplary method of dynamically reconfiguring a programmable system on a chip, in accordance with embodiments of the present invention.

FIG. 10 illustrates a flow diagram of an exemplary method 1000 of dynamically reconfiguring a programmable system on a chip, in accordance with embodiments of the present invention. In 1010, a first window is displayed comprising a representation of a target apparatus. The target apparatus comprises the programmable system on a chip.

In 1020, responsive to a selection of a graphical element of the representation, a second window comprising graphical user interface (GUI) display elements of a plurality of parameter values presently controlling operation of a device corresponding to the graphical element is displayed. The parameter display may be numeric, textual and/or graphical.

In 1030, a modification to the plurality of parameter values is accepted via the GUI display elements. The change may be made by keyboard input or via a cursor directing device, e.g., a mouse. In 1040, the modification is communicated to the programmable system on a chip.

In optional 1050, the operation of the device is controlled utilizing the modification. In optional 1060, a configuration file for the programmable system on a chip is updated with the modification.

In optional 1070, responsive to modifying one of an alphanumeric display and a graphical display of a parameter value, the modification is automatically reflected to the other one of the graphical display and the alphanumeric display. In optional 1080, the operation of the target device, as modified, is displayed in the second window.

Beneficially, embodiments in accordance with the present invention improve usability and reduce the likelihood of errors during a configuration of an integrated circuit within a design. The novel reconfiguration process is straight-forward and intuitive, providing a visual representation of the target hardware and sensor(s) for which parameter values are displayed and modified. In addition, the parameter value changes are reflected in the target operation in real time, providing immediate feedback as to the effect of the changes. Further, the parameter value changes made may update a configuration file, advantageously providing the changed values to other substantiations of a design. The changes to a configuration file do not require the cumbersome conventional art process of recompiling and reloading.

Embodiments in accordance with the present invention provide systems and methods for dynamically reconfiguring a programmable system on a chip. Embodiments in accordance with the present invention also provide for systems and methods for dynamically reconfiguring a programmable system on a chip that provide graphical user interface display elements of a plurality of parameter values presently controlling operation of a device on a target apparatus. In addition, systems and methods for dynamically reconfiguring a programmable system on a chip that provide graphical user interface display elements operable to accept modifications to the plurality of parameter values are provided. Further, embodiments in accordance with the present invention provide for systems and methods for dynamically reconfiguring a programmable system on a chip that are compatible and complimentary with existing methods of integrated circuit device configuration.

Various embodiments of the invention are thus described. While the present invention has been described in particular embodiments, it should be appreciated that the invention should not be construed as limited by such embodiments, but rather construed according to the below claims.

What is claimed is:

1. A graphical user interface for dynamically reconfiguring a programmable chip comprising:
   graphical user interface (GUI) display elements configured to display a plurality of parameter values presently controlling operation of a device on a target apparatus comprising said programmable chip;
   wherein said GUI display elements are further configured to accept modifications to said plurality of parameter values; and
   said GUI display elements further configured to, during the operation of the device according to the plurality of parameter values, communicate said modifications to said programmable chip and wherein said GUI display elements are responsive to the programmable chip for displaying operational results of said device based on operation of the device according to said modifications to said plurality of parameter values.

2. The graphical user interface of claim 1 wherein said GUI display elements display said plurality of parameter values in an alphanumeric format.

3. The graphical user interface of claim 2 wherein said GUI display elements are operable to accept alphanumeric input.

4. The graphical user interface of claim 1 wherein said GUI display elements display said plurality of parameter values in a graphical format.

5. The graphical user interface of claim 4 wherein said GUI display elements are operable to accept cursor directing device input.

6. The graphical user interface of claim 4 wherein said GUI display elements display a physical representation of said device.

7. The graphical user interface of claim 1 wherein said device comprises a capacitively sensed input device.

8. The graphical user interface of claim 7 wherein said capacitively sensed input device comprises a slider.

9. The graphical user interface of claim 1 wherein said device comprises an output device.

10. The graphical user interface of claim 9 wherein said output device comprises three light sources of different color for producing in combination a range of colors.

* * * * *